(12) United States Patent
Pfalzgraf et al.

(10) Patent No.: US 6,457,770 B1
(45) Date of Patent: Oct. 1, 2002

(54) MOTOR VEHICLE ROOF WITH TWO COVERS AND A HEADLINER FOR ONE SUCH MOTOR VEHICLE ROOF

(75) Inventors: Manfred Pfalzgraf, Herrsching (DE); Francois De Gaillard, Mouilleron en pareds (FR); Bernd Schleicher, München (DE); Walter Schätzler, Starnberg (DE)

(73) Assignee: Webasto Vehicle Systems International GmbH, Stockdorf (DE)

( * ) Notice: Subject to any disclaimer, the term of this patent is extended or adjusted under 35 U.S.C. 154(b) by 0 days.

(21) Appl. No.: 09/803,425

(22) Filed: Mar. 12, 2001

(30) Foreign Application Priority Data

Mar. 10, 2000 (DE) .......................... 100 11 350

(51) Int. Cl.⁷ ............................... B60J 7/22; B60J 7/47
(52) U.S. Cl. ................... 296/217; 296/214; 296/220.01
(58) Field of Search ................................ 296/217, 214, 296/220.01, 221–223

(56) References Cited

U.S. PATENT DOCUMENTS 4,852,938 A * 8/1989 Hirshberg et al. .. 296/216.05 X
5,002,334 A * 3/1991 Meiler et al. ........... 296/221 X
5,601,330 A   2/1997 Ulbrich et al.

FOREIGN PATENT DOCUMENTS

| DE | 37 25 982 A1 | 2/1989 |
| DE | 40 41 908 | 1/1992 |
| DE | 44 13 704 | 1/1996 |
| DE | 195 03 786 | 8/1996 |
| DE | 197 01 211 C1 | 2/1998 |
| EP | 0 447 781 | 9/1991 |
| EP | 854061 | * 1/1996 |

* cited by examiner

*Primary Examiner*—Dennis H. Pedder
(74) *Attorney, Agent, or Firm*—Nixon Peabody LLP; David S. Safran

(57) ABSTRACT

A motor vehicle roof with a fixed roof structure having a roof opening, two successive adjustable covers for closing and at least partially clearing the roof opening. At least one of the covers is selectively movable longitudinally out of its closed position into an open position and both of the covers are selectively pivotable out of their closed positions into a ventilation position.

17 Claims, 4 Drawing Sheets

MOTOR VEHICLE ROOF WITH TWO COVERS AND A HEADLINER FOR ONE SUCH MOTOR VEHICLE ROOF

BACKGROUND OF THE INVENTION

1. Field of the Invention

The present invention is directed to a motor vehicle roof including a fixed roof structure having front and rear roof openings, two selectively adjustable covers for closing a respective roof opening, whereby at least one of the covers is selectively movable longitudinally from a closed position into an open position to at least partially clear a respective roof opening, and whereby the covers are pivotable out of the closed position into a ventilation position. The invention, furthermore, relates to a headliner arrangement for a motor vehicle roof with a roof opening which is made in the fixed roof structure and with two successive adjustable covers for closing and partially clearing the roof opening, and the front headliner unit can be pushed out of the covering position which is assigned to the front cover to the rear into the open position, and the rear headliner unit can be pushed out of the covering position assigned to the rear cover, forward into the open position.

2. Description of the Prior Art

European Patent Publication EP 0 447 781 A2 describes a sliding and lifting roof with two covers which are located in succession in a closed position which closes the roof opening. The front cover can be raised at its rear edge from the closed position into a ventilation position. When the front cover is raised into the ventilation position, the displacement means forcibly lowers the front edge of the rear cover. In the raised ventilation position of the front cover, it can be shifted to the rear to over the rear cover, or the rear cover can be pushed under the front cover in order to clear the front or the rear section of the roof opening.

With known headliner arrangements of the type the invention is directed toward, two comparatively large-area headliner elements are guided on respective guide rails which are located with a vertical offset relative to one another under the fixed roof structure so that they can be stowed at the same time on top of one another under the middle part of the roof. However, the free head space for vehicle passengers is reduced by the guide rail which has been offset down.

SUMMARY OF THE INVENTION

The object of the invention is to devise the initially mentioned motor vehicle roof in which optimized ventilation of the motor vehicle can be achieved by different cover positions.

Another object of the invention is to devise a headliner for a motor vehicle roof of the initially mentioned type which can be stowed under the roof in its open position with little space requirement.

These and other objects may be achieved in accordance with the present invention in the initially mentioned type of motor vehicle roof in that the front cover and the rear cover can be raised with their respective rear edges about their front edges into their ventilation positions. The rear edges can be raised by pivoting the cover about its front edge or about a transverse axis which runs in the continuing area about the front edge of the cover. Accordingly, two sliding and lifting roofs are combined, and the rear sliding and lifting roof or the rear cover can be moved forward to under the front cover by a guide mechanism from its closed position.

The objects may also be achieved in the initially mentioned type of motor vehicle roof in accordance with the present invention also in that the front cover can be lowered about its rear edge into its ventilation position and the rear cover can be raised about its front edge into its ventilation position. The front, lowerable cover, as a result of the lowering of its front edge, is also called the "front vent". By way of the lowered front edge on the front cover and the raised rear edge of the rear cover two ventilation openings which are distant from one another are made available with improved ventilation action for the entire motor vehicle interior.

Furthermore, the objects may be achieved in accordance with the present invention in the initially mentioned motor vehicle roof in that the front cover can be pivoted about its front edge into its ventilation position and the rear cover can be lowered about its rear edge into its ventilation position.

Finally, the objects of the invention may be achieved such that the front cover and the rear cover can be lowered on their respective front edges about their respective rear edges into their ventilation positions. In addition, in a preferred embodiment, the motor vehicle roof includes a pivotable wind deflector in front of the front cover, the wind deflector being pivotable so that a draft can be produced for ventilating the interior of the motor vehicle, and especially for the front cover which can be lowered on its front edge, a clearly larger ventilation opening can be set when the pivoted-out wind deflector also clears an additional opening.

The objects may also be achieved with respect to the aforementioned headliner in that the two headliner units are guided roughly in a common plane near the roof out of their cover positions in the direction to their open positions and that at least one of the two headliner units in the longitudinal direction is divided into at least two headliner elements which can be displaced or pivoted relative to one another, and while it is being pushed to its open position, it is guided from its arrangement near the roof to under the other headliner unit. The division of the large-area headliner unit into at least two or even more headliner elements which are shorter in the longitudinal direction makes the headliner unit flexible about one or more transverse axes such that it can be moved into a stowed position and can be deposited therein, and the guides to the stowage position can be located near the roof. In this way, the head space for the vehicle passengers is not unduly limited. The headliner unit can have individual, separate elements which can be flexibly or pivotably joined to one another, or alternatively, it can be made in one piece with sections divided in the longitudinal direction with varied bending flexibility in order, for example, to be able to follow a guideway which is bent in a S-shape.

Preferably, a headliner unit is movably supported on a guide which essentially follows the roof contour and which extends from the assigned cover to the middle part of the headliner, and the other headliner unit is movably guided on a guide which runs in the area of the middle part of the headliner underneath the other guide. If the two headliner units can be moved independently of one another, according to the requirements of the vehicle passengers, then only one of the headliner elements can be partially or completely closed.

Embodiments of the motor vehicle roof and the headliner are explained below with reference to the drawings.

DETAILED DESCRIPTION OF THE PREFERRED EMBODIMENTS

Figure 1:
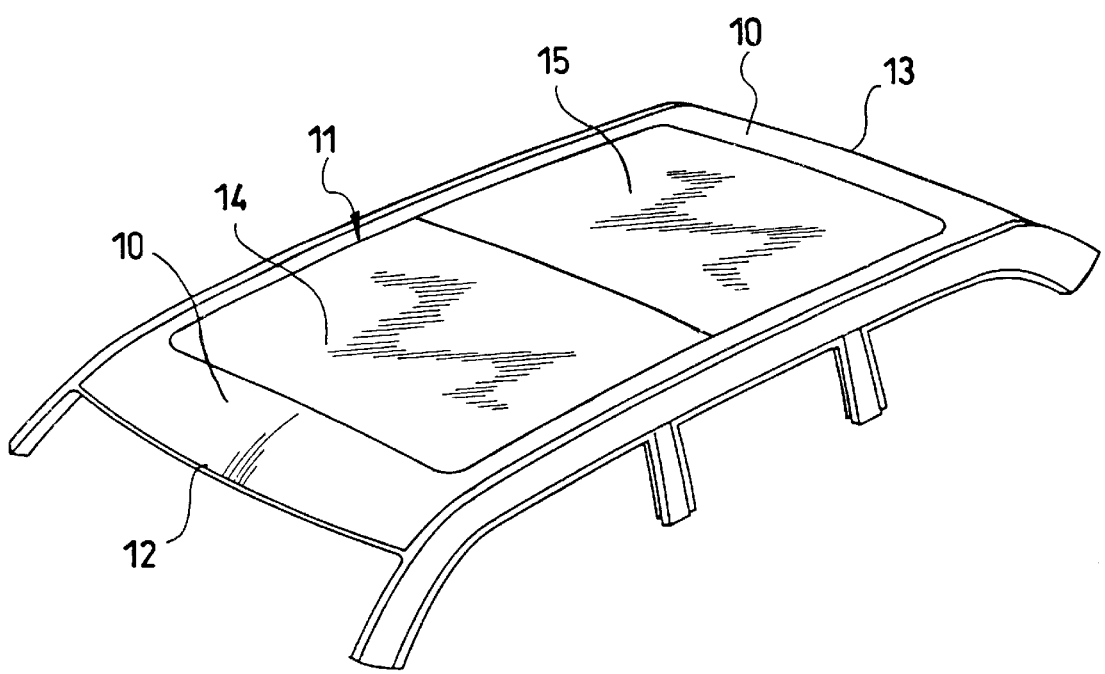
FIG. 1 is a perspective view of the roof of a motor vehicle.

FIG. 1 shows a motor vehicle roof including a fixed roof structure 10 which has a roof opening 11 which extends from near the front edge 12 of the fixed roof structure 10 to near the rear edge 13 of the fixed roof structure 10. On the bottom of the fixed roof structure 10, a frame (not shown) is attached which, on each side of the roof opening 11, has guide rails in which the front cover 14 and the rear cover 15 are movably supported in the longitudinal direction of the motor vehicle. Furthermore, the two covers 14, 15 are each provided with a pivoting-out mechanism (not shown) by which the front cover 14 and the rear cover 15 can be raised or lowered into the ventilation positions on the respective rear edge 16 and 17 of the covers with respect to the front edge 18 and 19 of the covers, or alternatively, on the front edge 18 and 19 of the covers with respect to the rear edge 16 and 17 of the covers. Moreover, the two covers 14, 15 can be raised or lowered about their front or rear edges, or one of the covers 14, 15 can be raised or lowered about its front edge and the other cover can be raised or lowered about its rear edge.

Figure 2A:
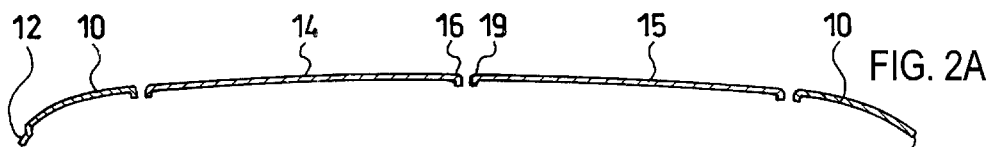
FIGS. 2A to 2H are schematic side views of a motor vehicle roof in different positions of the covers of the roof openings.
Figure 2B:
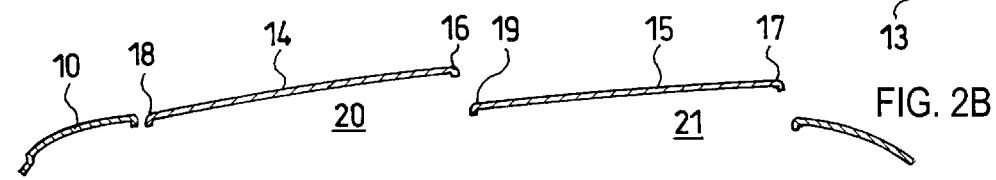

For their pivoting motion and their displacement motion along the guide rails, the covers 14, 15 are each driven by a separate drive which can be made in the known manner as an electric motor with a pinion and compressively-stiff drive cables. As shown in FIG. 2D, a displacement mechanism (not shown) lowers one of the covers 14, 15 as it is pushed lengthwise to under the other cover. As shown in FIG. 2A, in the closed position of the motor vehicle roof shown, the front cover 14 closes a front section 20 of the roof opening 11, when the covers 14, 15 are the same size, while the rear cover 15 closes the rear section 21 or the rear half. FIG. 2B shows a position in which the rear edge 16 of the front cover 14 and the rear edge 17 of the rear cover 15 are raised for ventilation purposes by pivoting about the respective front edges 18 and 19.

Figure 2C:
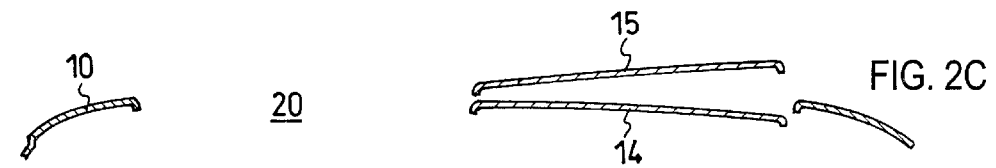
Figure 2D:
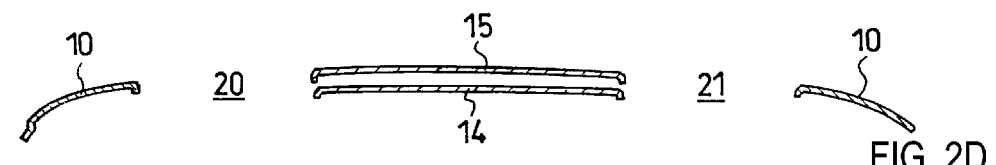

In FIG. 2C, the front cover 14 is selectively moved to the rear out of its closed position along its guide rails, and in doing so, is lowered and pushed entirely under the rear cover 15 which is still pivoted into the ventilation position in order to completely clear the front section 20 of the roof opening 11. In FIG. 2D, the front cover 14 is lowered out of its closed position and is selectively moved along its guide rails to the rear to under the rear cover 15 which is pushed out of its closed position, forward into the middle of the roof opening 11. One part of the front section 20 and of the rear section 21 of the roof opening 11 at a time are thus cleared, in a middle arrangement of the covers 14, 15, two same-sized openings sections 20 and 21 being formed.

Figure 2E:
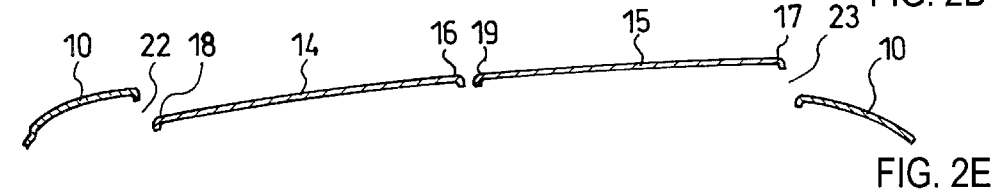
Figure 2F:

In another embodiment, the front cover 14 can be lowered via its raising mechanism on its front edge 18 into a ventilation position. According to FIG. 2E, a roof position can be set in which the front cover 14 is lowered on its front edge 18, while the rear edge 17 of the rear cover 15 is raised toward the top. In this way a ventilation opening 22 is formed on the front edge of the roof opening 11 and a ventilation position 23 is formed on the rear edge of the roof opening 11. As shown in FIG. 2F, for complete opening of the rear section or of the rear section 21 of the roof opening 11, the rear cover 15 can be pushed out of its closed position forward to under the front cover 14. Alternatively, the rear cover 15 is pushed forward on its guide rails, after the front cover 14 has been lowered (not shown).

Figure 2G:
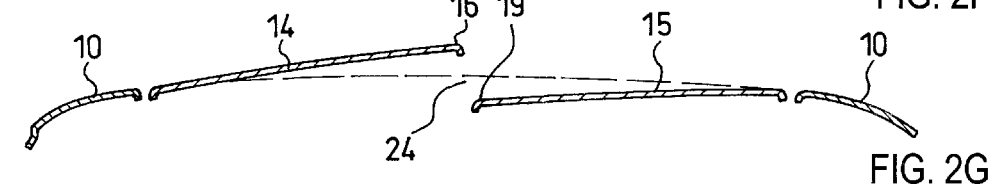
Figure 2H:
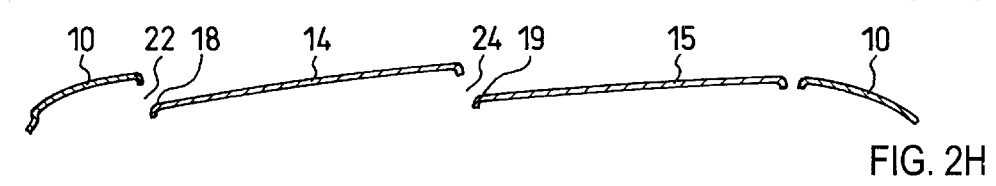

In the embodiment of the motor vehicle roof shown in FIG. 2G, the rear cover 15 can be lowered at its front edge into a ventilation position by way of its raising mechanism, while the front cover 14 can be raised at its rear edge 16. In the position of the two covers 14, 15 shown in FIG. 2G, a middle ventilation opening 24 is opened at roughly twice the height obtainable by either cover by itself. Finally, as shown in FIG. 2H, in another embodiment of the motor vehicle roof both the front cover 14 and also the rear cover 15 on their front edges 18 and 19 can be lowered in the ventilation positions.

For complete opening of the front and the rear sections 20, 21 of the roof opening 11, or for partial opening of at least one of the front section 20 and the rear section 21 of the roof opening 11, in the described embodiments the front cover 14 is pushed to the rear and the rear cover 15 is pushed to the front by the corresponding path, one cover being pushed horizontally on its guide rails and the other cover being lowered to under the former cover. The control of the drives of the two covers 14, 15 is made such that the pivoting motions of the covers 14, 15 and also their displacement motions can be executed independently of one another, collision of the covers 14, 15 being precluded during the displacement by the arrangement of the guide rails.

Figure 3A:
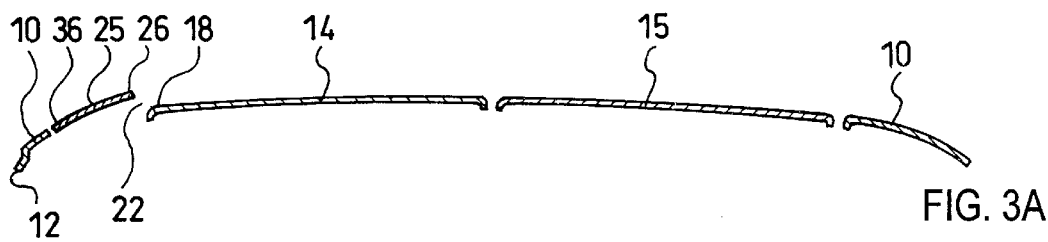
FIGS. 3A to 3D are schematic side views of a motor vehicle roof with a wind deflector in different positions of the covers of the roof openings.

The embodiments of the motor vehicle roof shown in FIGS. 3A–3D are formed essentially, like the above described examples, however, they include a wind deflector 25 which is located between the front edge 12 of the fixed roof structure 10 and the front cover 14, and can be raised at its rear edge 26 by being pivoted up about its front edge 36. The wind deflector 25 can be made as a louver which is located as a layered part of the fixed roof structure 10, flush on the latter, and can be pivoted up out of this flush arrangement so that the fixed part of the roof structure 10 which remains underneath the louver preserves its fixed arrangement. As shown in FIG. 3A, in an alternative embodiment, the wind deflector 25 forms a movable part of the fixed roof structure 10 in its entirety which can be pivoted up as the wind deflector unit of the fixed roof structure 10 and thus can clear an additional ventilation opening 22 between the raised rear edge 26 of the wind deflector 25 and the front edge 18 of the front cover 14 which is located in its closed position. The wind deflector 25 can be used in all the motor vehicle roofs which are shown in FIGS. 2A–2H.

Figure 3B:
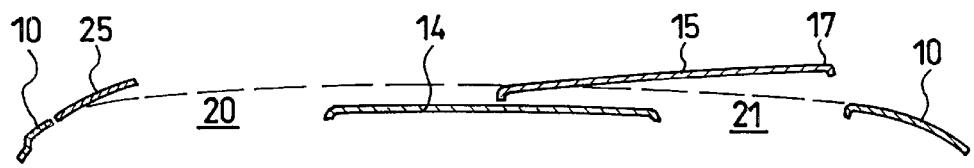
Figure 3C:
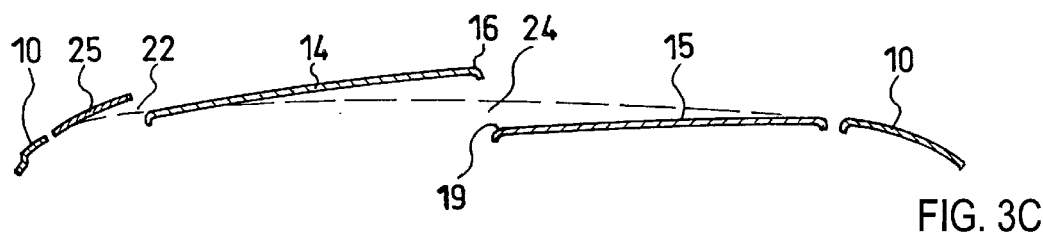

FIG. 3B shows a position of the covers 14, 15 in which the front cover 14 is pushed out of its closed position to the rear into the middle of the roof opening 11 and to under the rear cover 15 while the rear cover 15 is raised at its rear edge 17 in the ventilation position. As shown in FIG. 3C, the rear cover 15 is lowered at its front edge 19 into the ventilation position. While, when the front cover 14 is closed, the front ventilation opening 22 which is formed by the raised wind deflector 25 and the ventilation opening 24 which is partially cleared by the rear cover 15, yield good, draft-free ventilation, the ventilation action is improved even more when, as shown in the figure, the front cover 14, 16 is pivoted out at its rear edge into the ventilation position so that the ventilation opening 24 is opened with its greatest height which is twice that obtainable by moving the covers as shown for opening 24 in FIGS. 3B and 3D, for example.

Figure 3D:
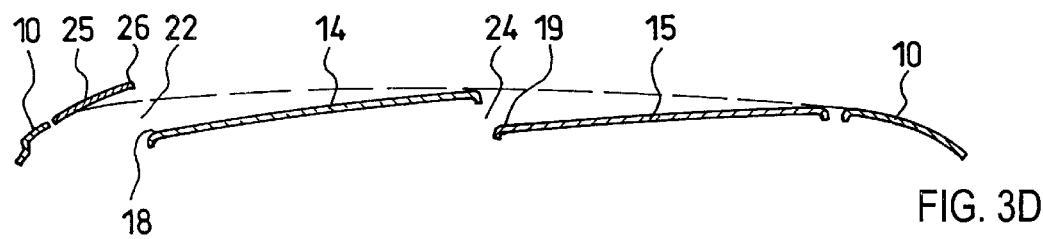

The motor vehicle roof shown in FIG. 3D contains a front cover 14 which can be lowered at its front edge 18 into the ventilation position. With the wind deflector 25 pivoted up, between the rear edge 26 of the wind deflector 25 and the front edge 18 of the front cover 14 lowered relative to the closed position (on the broken line of the roof), thus, a much larger front ventilation opening 22 is formed which, in conjunction with the ventilation opening 24 which has been cleared by the rear cover 15, enables even more improved ventilation by air circulation from the interior through the front ventilation opening 22 to the outside over the front cover 14 and though the middle ventilation opening 24 back into the interior.

Figure 4A:
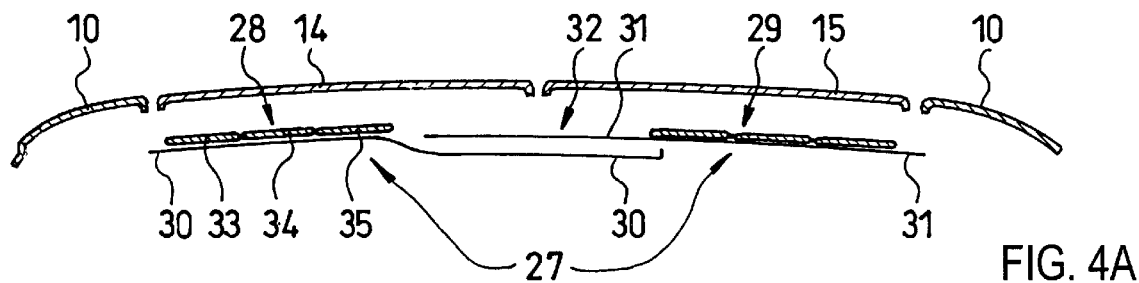
FIGS. 4A to 4C are schematic side views of a roof with a headliner in the open and closed position of the roof and of the headliner.
Figure 4B:
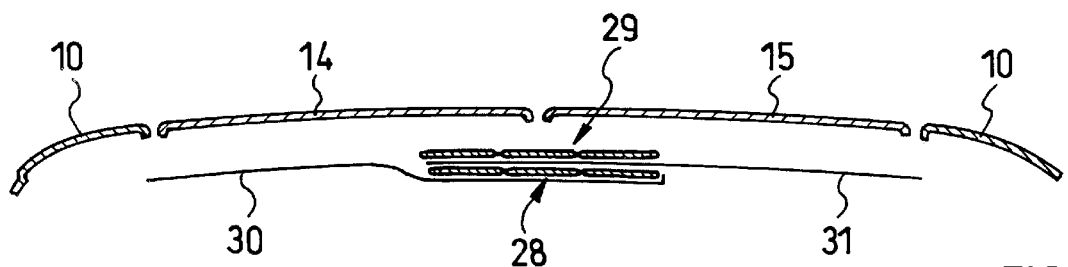
Figure 4C:
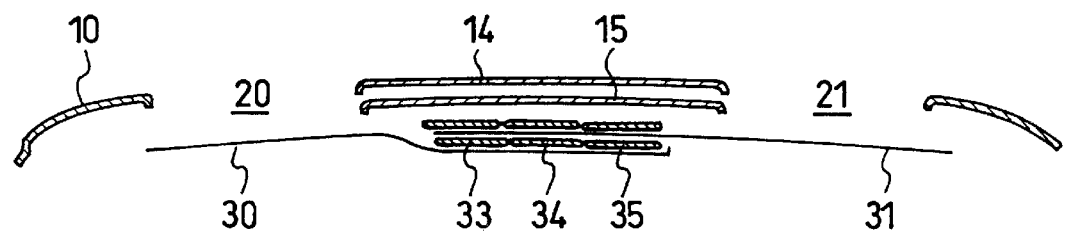

FIGS. 4A to 4C show a motor vehicle roof including a headliner 27 having a front headliner unit 28 which is assigned to the front section 20 of the roof opening 11 and the front, especially transparent, cover 14, and a rear headliner unit 29 which is assigned to the rear section 21 of the roof opening 11 and the rear, especially transparent, cover 15. The headliner units 28, 29 are movably located on each side of the roof opening 11 on a respective one of the guide rails 30, 31. The rear guide rail 31 extends in the plane near the roof, forward to beyond the rear edge 16 of the front cover 14. The front guide rail 30, which runs roughly in the area under the front cover 14 approximately in one plane with the rear guide rail 31 near the motor vehicle roof, is lowered at the beginning of the middle section 32 of the headliner to under the rear guide rail 31, and extends underneath from it at a distance which is slightly greater than the thickness of the front headliner unit 28.

At least the front headliner unit 28 is divided in the longitudinal direction into a plurality, for example, three headliner elements 33, 34, 35, which are connected flexibly to one another and are connected especially offset relative to one another, or so as to pivot about one or more transverse axes. By dividing the headliner unit 28 into headliner elements 33, 34, 35 which are shorter in the longitudinal direction, they can follow, as a result of their greater flexibility, the path of the front guide rail 30 which is curved in an S-shape over a short distance (thereby reducing headroom in the smallest possible region) and can be guided into the lower deposition plane under the middle section 32. As shown in FIG. 4C, the rear headliner unit 29 is pushed on its guideway 31 over the front headliner unit 28 which is located underneath into the middle section 32 of the headliner so that the two headliner units 28, 29 clear front and rear sections 20, 21 of the roof opening 11. The rear headliner unit 29 can also be divided into two or more headliner elements, this division not being necessary in this embodiment, in which the rear headliner unit 29 is guided roughly on the largely planar path of the guide rail. The plane in which the guide rails 30, 31 are essentially arranged can be flat or curved according to the shape of the fixed roof structure.

It is noted that the displacement mechanisms for the covers and headliners have not been shown or described in specific detail since such forms no part of the invention. Those skilled in the sunroof art, given the motions described, will easily be able to apply any of various known drive and linkage techniques to achieve the described effects.

What is claimed is:

1. A motor vehicle roof comprising:
   a fixed roof structure having roof opening with a front roof opening portion and a rear roof opening portion; and
   a front cover having a closed position in which said front cover closes said front roof opening portion and a rear cover having a closed portion in which said rear cover closes said rear roof opening portion;
   wherein at least one of said front cover and said rear cover is selectively movable longitudinally out of said closed position into an open position to at least partially clear a respective roof opening portion,
   wherein said front cover and said rear cover are selectively pivotable about at least one of front and rear edges thereof from said closed position into a ventilation position in which at least one of front and rear edges thereof protrudes out of plane of said fixed roof structure and of said covers in said closed position thereof;
   wherein said front cover is selectively pivotable about a rear edge of said front cover from said closed position into said ventilation position such that respective front edge of said front cover protrudes downward and out of the plane of said fixed roof structure, and wherein said rear cover is selectively pivotable about a front edge thereof from said closed position into a ventilation position such that respective rear edge of said rear cover protrudes upward and out of a plane of said fixed roof structure.

2. A motor vehicle roof as claimed in claim 1, wherein said front cover and said rear cover are selectively pivotable about a respective front edge thereof from said closed position into said ventilation position such that the respective rear edge of said front and rear covers protrudes upwardly out of said plane of the fixed roof structure.

3. The motor vehicle roof as claimed in claim 2, wherein at least one of said front cover and said rear cover are selectively movable into an intermediate position to at least partially clear a respective roof opening portion.

4. The motor vehicle roof as claimed in claim 3, wherein said front cover and said rear cover are selectively movable to said intermediate position such that one of the covers is positioned on top of the other of the covers.

5. The motor vehicle roof as claimed in claim 4, further comprising a wind deflector positioned proximate to said front cover, said wind deflector being pivotably movable about a front edge of said wind deflector so as to cause a rear edge of said wind deflector to protrude upward and out of said plane of said fixed roof structure.

6. The motor vehicle roof as claimed in claim 5, further comprising a headliner assembly including a front headliner positioned underneath said front roof opening portion, said front headliner being selectively guided in a plane proximate said fixed roof structure from a cover position to an intermediate position to at least partially expose said front roof opening portion, and a rear headliner positioned underneath said rear roof opening portion, said rear headliner being selectively guided in a plane proximate said fixed roof structure from a cover position to an intermediate position to at least partially expose said rear roof opening portion.

7. The motor vehicle roof as claimed in claim 6, wherein at least one of said front headliner and said rear headliner is divided longitudinally into at least two headliner sections which are pivotably connected to one another.

8. The motor vehicle roof as claimed in claim 7, wherein at least one of said front headliner and said rear headliner is movable supported on a first guide which essentially follows a contour path of said fixed roof structure and which extends under a respective one of said front and rear covers, the other of said front headliner and said rear headliner being movably guided on a second guide which extends underneath said respective intermediate position and underneath said first guide.

9. The motor vehicle roof as claimed in claim 8, wherein said front headliner and said rear headliner are selectively movable independently of one another.

10. A motor vehicle roof according to claim 1, wherein said front cover is selectively pivotable about a front edge of said front cover from said closed position into said ventilation position such that respective rear edge of said front cover protrudes upward and out of the plane of said fixed roof structure, and wherein said rear cover being selectively pivotable about a rear edge thereof from said closed position into a ventilation position such that respective front edge of said rear cover protrudes downward and out of a plane of said fixed roof structure.

11. The motor vehicle roof as claimed in claim 10, wherein at least one of said front cover and said rear cover are selectively movable into an intermediate position to at least partially clear a respective roof opening portion.

12. The motor vehicle roof as claimed in claim 11, wherein said front cover and said rear cover are selectively movable to said intermediate position such that they are positioned one on top of the other.

13. The motor vehicle roof as claimed in claim 12, further comprising a wind deflector positioned proximate to said front cover, said wind deflector being pivotably movable about a front edge of said wind deflector so as to cause a rear edge of said wind deflector protrude upward and out of a plane of said fixed roof structure.

14. The motor vehicle roof as claimed in claim 13, further comprising a headliner assembly including a front headliner positioned underneath said front roof opening portion, said front headliner being selectively guided in a plane proximate said fixed roof structure from a cover position to an intermediate position to at least partially expose said front roof opening portion, and a rear headliner positioned underneath said rear roof opening portion, said rear headliner being selectively guided in a plane proximate said fixed roof structure from a cover position to an intermediate position to at least partially expose said rear roof opening.

15. The motor vehicle roof as claimed in claim 14, wherein at least one of said front headliner and said rear headliner is divided longitudinally into at least two headliner sections which are pivotably connected to one another.

16. The motor vehicle roof as claimed in claim 15, wherein at least one of said front headliner and said rear headliner is movably supported on a first guide which essentially follows a contour path of said fixed roof structure and which extends from a respective one of said front and rear covers to a position underneath said fixed roof section, the other of said front headliner and said rear headliner being movably guided on a second guide which extends underneath said intermediate position and underneath said first guide.

17. The motor vehicle roof as claimed in claim 16, wherein said front headliner and said rear headliner are selectively movable independently of one another.

\* \* \* \* \*